US010748341B2

(12) United States Patent
Ogasawara

(10) Patent No.: US 10,748,341 B2
(45) Date of Patent: Aug. 18, 2020

(54) TERMINAL DEVICE, SYSTEM, PROGRAM AND METHOD FOR COMPOSITING A REAL-SPACE IMAGE OF A PLAYER INTO A VIRTUAL SPACE

(71) Applicant: GungHo Online Entertainment, Inc., Tokyo (JP)

(72) Inventor: Hiroyuki Ogasawara, Tokyo (JP)

(73) Assignee: GungHo Online Entertainment, Inc. (JP)

(*) Notice: Subject to any disclaimer, the term of this patent is extended or adjusted under 35 U.S.C. 154(b) by 0 days.

(21) Appl. No.: 15/993,215

(22) Filed: May 30, 2018

(65) Prior Publication Data

US 2019/0188914 A1 Jun. 20, 2019

Related U.S. Application Data

(63) Continuation of application No. PCT/JP2017/045252, filed on Dec. 18, 2017.

(51) Int. Cl.
*G06T 19/00* (2011.01)
*A63F 13/655* (2014.01)
(Continued)

(52) U.S. Cl.
CPC .......... *G06T 19/006* (2013.01); *A63F 13/327* (2014.09); *A63F 13/428* (2014.09);
(Continued)

(58) Field of Classification Search
CPC ................. A63F 13/327; A63F 13/428; A63F 2300/105; A63F 2300/1087; A63F 2300/8082; G06T 19/006
See application file for complete search history.

(56) References Cited

U.S. PATENT DOCUMENTS 9,600,936 B2 3/2017 Boivin et al.
2007/0257940 A1 11/2007 Ohta
(Continued)

FOREIGN PATENT DOCUMENTS

JP 06176131 A * 6/1994
JP H0-176131 A 6/1994
(Continued)

OTHER PUBLICATIONS

Takaya, Yuki et al.: "Interactive 3D Contents Generation for Autostereoscopic Display based on Depth Camera", 16th Symposium on Sensing via Image Information SSII2010; Jun. 2010 (23 pages).
(Continued)

*Primary Examiner* — Diane M Wills
(74) *Attorney, Agent, or Firm* — Harness, Dickey & Pierce, P.L.C.

(57) ABSTRACT

A terminal device includes a memory configured to store computer-readable instructions and a processor configured to perform the computer-readable instructions. The processor is configured to: cause a real space camera in a real space to capture a real space image including a real player; cause a virtual space camera in a virtual space to capture a virtual space image including a virtual object, the real player performing an instruction input to the virtual object; create a composite image that is formed by composing part of the virtual space image stored in the memory and a player image in the real space image stored in the memory; and output the composite image to a display so that the display is configured to display the composite image.

15 Claims, 10 Drawing Sheets

(51) Int. Cl.
 *A63F 13/428* (2014.01)
 *A63F 13/327* (2014.01)

(52) U.S. Cl.
 CPC . *A63F 2300/105* (2013.01); *A63F 2300/1087* (2013.01); *A63F 2300/8082* (2013.01)

(56) References Cited

U.S. PATENT DOCUMENTS

| | | | |
|---|---|---|---|
| 2013/0278596 | A1 | 10/2013 | Wu et al. |
| 2014/0085330 | A1 | 3/2014 | Sugita et al. |
| 2015/0161818 | A1* | 6/2015 | Komenczi ............... G06T 17/00 348/43 |
| 2016/0005234 | A1* | 1/2016 | Boivin ................... H04N 5/272 345/419 |
| 2016/0148429 | A1* | 5/2016 | Groppa ................. G06T 19/006 345/419 |
| 2017/0365100 | A1* | 12/2017 | Walton ................. G06T 19/006 |
| 2018/0082114 | A1* | 3/2018 | Itkowitz ............. G06K 9/00375 |

FOREIGN PATENT DOCUMENTS

| | | |
|---|---|---|
| JP | 2001-195601 A | 7/2001 |
| JP | 2001-307124 A | 11/2001 |
| JP | 2014-71501 A | 11/2001 |
| JP | 2002-218454 A | 8/2002 |
| JP | 2017-170106 A | 8/2002 |
| JP | 2012-174218 A | 9/2012 |
| JP | 2013-225740 A | 10/2013 |
| JP | 2015-521419 A | 7/2015 |

OTHER PUBLICATIONS

Japanese Office Action for Patent Application No. JP2017-566043 dated Jun. 4, 2019 (5 pages).
Japanese Office Action for Patent Application No. JP2017-566043 dated Oct. 29, 2019 with English translation (8 pages).

* cited by examiner

TERMINAL DEVICE, SYSTEM, PROGRAM AND METHOD FOR COMPOSITING A REAL-SPACE IMAGE OF A PLAYER INTO A VIRTUAL SPACE

CROSS-REFERENCE TO RELATED APPLICATIONS

The present application is a continuation application of International Application No. PCT/JP2017/045252, filed on Dec. 18, 2017, which is expressly incorporated herein by reference in its entirety.

BACKGROUND

1. Technical Field

The present disclosure relates to a terminal device, a system, a program, and a method for compositing an image of a captured player in a real space, the player performing an instruction input to a virtual object arranged in a virtual space, with the virtual space, and outputting a composite image.

2. Related Art

Conventionally, systems for enabling a player to operate an operation target object arranged in a virtual space in conjunction with an instruction input of the player are known. As an example, there is a system, as described in JP 2017-170106 A, in which a player wears a head mounted display (HMD), moves with his/her own viewpoint in a virtual space displayed on a display of the head mounted display, and operates an operation target object, thereby to experience virtual reality where the player feels as if he/she exists in the virtual space.

However, in such a case, while the player can recognize the virtual space via the head mounted display, a third person is merely viewing or watching the player's operation, which cannot be said to be sufficiently attractive.

SUMMARY

Therefore, the present disclosure provides, on the basis of the above technologies, a terminal device, a system, a program, or a method for enabling display of a virtual space that is highly attractive to a third person.

According to an aspect of the present disclosure, there is provided "a terminal device comprising: a memory in which computer-readable instructions are stored; and a processor configured to perform the computer-readable instructions so as to: composite, from a virtual space image virtually imaged by a virtual camera arranged in a virtual space and a real space image captured by a real space camera arranged in a real space and including a player in the real space, the player performing an instruction input to a virtual object arranged in the virtual space, at least a part of the virtual space image and a player image included in the real space image; and output the composite image".

According to an aspect of the present disclosure, there is provided "a system comprising: the terminal device according to the above aspect; a real space camera arranged in a real space, communicatively connected with the terminal device, and configured to capture a real space image including a player in the real space, the player performing an instruction input to a virtual object arranged in a virtual space; and a display communicatively connected with the terminal device and configured to display an image in which at least a part of a virtual space image virtually imaged by a virtual camera arranged in the virtual space and a player image included in the real space image are composited".

According to an aspect of the present disclosure, there is provided "a computer program product embodying computer-readable instructions stored on a non-transitory computer-readable storage medium for causing a computer to execute a process by a processor, the computer configured to perform the steps of: compositing, from a virtual space image virtually imaged by a virtual camera arranged in a virtual space, and a real space image captured by a real space camera arranged in a real space and including a player in the real space, the player performing an instruction input to a virtual object arranged in the virtual space, at least a part of the virtual space image and a player image included in the real space image; and outputting the composite image".

According to an aspect of the present disclosure, there is provided "a method for causing a processor in a computer to execute a process, the computer comprising a memory configured to store computer-readable instructions, the method comprising executing the computer-readable instructions on the processor the steps of: compositing, from a virtual space image virtually imaged by a virtual camera arranged in a virtual space, and a real space image captured by a real space camera arranged in a real space and including a player in the real space, the player performing an instruction input to a virtual object arranged in the virtual space, at least a part of the virtual space image and a player image included in the real space image; and outputting the composite image".

According to various embodiments of the present disclosure, a terminal device, a system, a program, or a method for enabling display of a virtual space that is highly attractive to a third person can be provided.

Note that the above-described effect is simply an example provided for illustrative purposes only, and is not restrictive for convenience of description. Any effect described in the present disclosure or an apparent effect for a person skilled in the art can be exhibited in addition to or in place of the above-described effect.

DESCRIPTION OF EXEMPLARY EMBODIMENTS

Figure 1A:
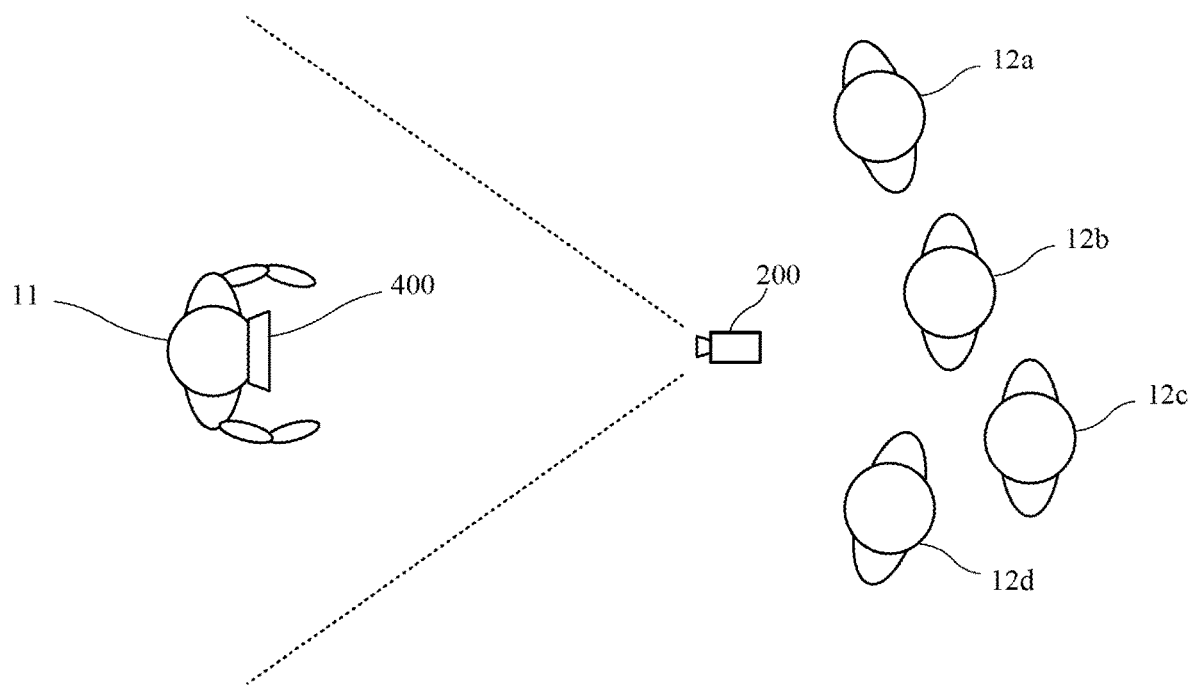
FIG. 1A is a diagram for conceptually describing a system 1 according to an embodiment of the present disclosure. Further.

Various embodiments of the present disclosure will be described with reference to the appended drawings. Note that the configuration element common in the drawings is denoted with the same reference sign.

1. Overview of System According to Embodiment of Present Disclosure

FIG. 1A is a diagram for conceptually describing a system 1 according to an embodiment of the present disclosure. Specifically, FIG. 1A illustrates a state in which a player 11 in a real space wears a head mounted display 400 and executes a game application in a virtual space. At this time, third persons 12a to 12d who are watching the game application in execution merely see the motion of the player 11 and cannot recognize processing performed in the virtual space, which is very boring. Therefore, in the present embodiment, a real space camera 200 is arranged in the real space and captures a real space image including the player 11. Further, a virtual camera 600 virtually arranged in the virtual space captures a virtual space image in synchronization with the capture of the real space image. Then, an image of the player 11 in the captured real space image and at least a part in the captured virtual space image are composited and displayed on a display 300. As a result, the third persons 12a to 12d can view how the player 11 moves and operates the operation target object in the virtual space of the game application in execution with realistic sensation.

Figure 1B:
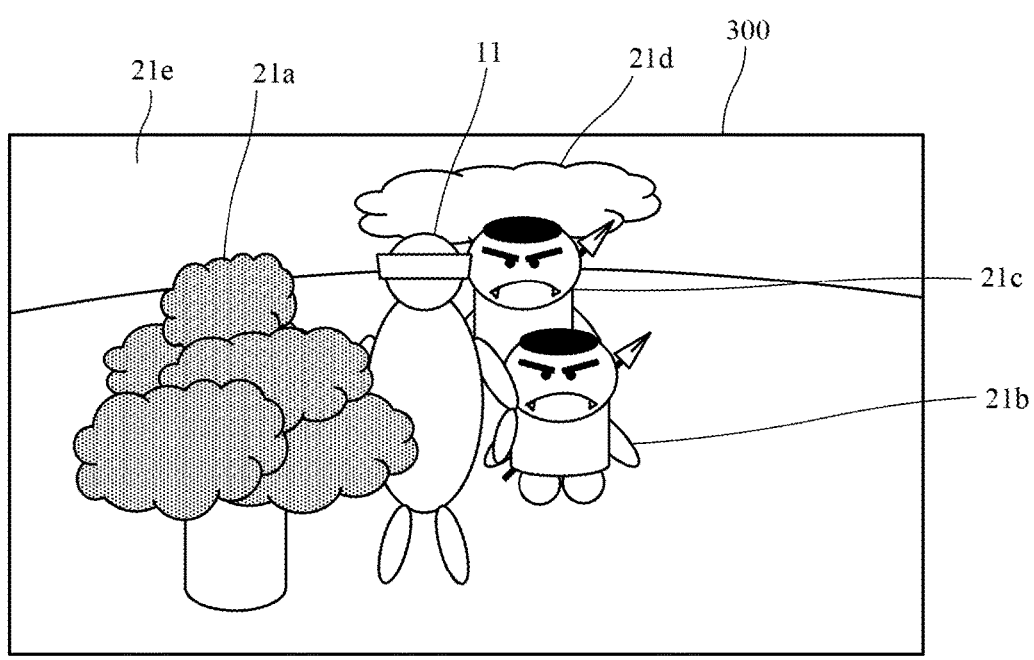
FIG. 1B is a diagram illustrating an example of a screen displayed on a display 300 of the system 1 according to an embodiment of the present disclosure.

FIG. 1B is a diagram illustrating an example of a screen displayed on a display 300 of the system 1 according to an embodiment of the present disclosure. Specifically, FIG. 1B illustrates an example of a screen that viewed by the third persons 12a to 12d on the display 300. According to FIG. 1B, an image of the player 11 captured by the real space camera 200 and a virtual space image captured by the virtual camera 600 are composited and displayed on a display panel 312 of the display 300. Therefore, the third persons 12a to 12d can view the state where the player 11 executes the game application in the virtual space including virtual objects (a background object 21e, a cloud object 21d, an enemy object 21c, an enemy object 21b, and a tree object 21a) with realistic sensation by viewing the image after composite.

Note that, in the present embodiment, the "third person" is merely used distinctively from the player 11. That is, the third person himself/herself may be one of players who execute the game application or may merely view the state of playing by the player 11.

In the present embodiment, the case of execution of the game application will be described. However, the embodiment is not limited to the game application, and the system 1 according to the present embodiment is favorably applicable to any application as long as the application uses a virtual space. For example, by use of the system 1 in applications such as medical simulation, driving simulation of automobiles, trains, airplanes, etc., simulation of travel to tourist spots, virtual shopping in virtual shops and virtual real estate, entertainment such as movies and music lives, other players (third persons) can share the scene of operation with a user as a player.

Further, in the present embodiment, a real space image, a real space depth image, a real space color image, a virtual space image, a virtual space depth image, a virtual space color image, and the like are used. These images mean not only images immediately after captured by cameras but also images after various types of processing.

Further, in the present embodiment, the virtual space image is captured by the virtual camera 600 in synchronization with or at the same or substantially same timing with capture by the real space camera 200. As an example, the capture by the virtual camera 600 is performed by rendering the virtual space where the virtual objects are arranged from the position of the virtual camera 600 and projecting the virtual objects in the virtual space on a virtual screen to obtain an image.

Figure 2:
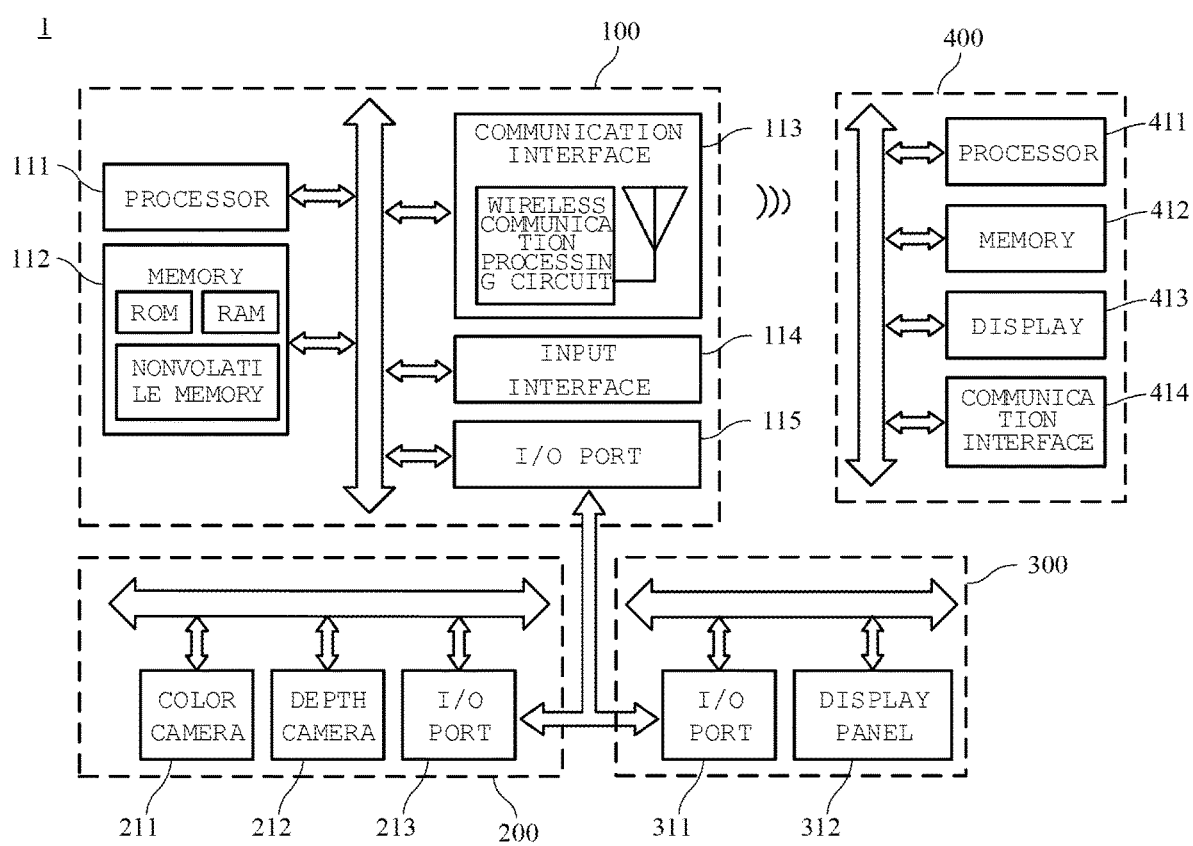
FIG. 2 is a block diagram illustrating a configuration of the system 1 according to an embodiment of the present disclosure.

2. Overall Configuration of System 1 According to First Embodiment of Present Disclosure FIG. 2 is a block diagram illustrating a configuration of the system 1 according to an embodiment of the present disclosure. Referring to FIG. 2, the system 1 includes a terminal device 100 that executes processing such as composite of images, the real space camera 200 that captures the real space image including the player 11 in the real space, who performs an instruction input to a virtual object arranged in the virtual space, and the display 300 for displaying an image in which at least a part of the virtual space image virtually imaged by the virtual camera arranged in the virtual space and a player image included in the real space image are composited, and the head mounted display 400 mounted by the player 11 and which displays the virtual space of the game application executed by the player 11. The terminal device 100, the real space camera 200, the display 300, and the head mounted display 400 are communicatively connected to one another by wired or wireless means.

Although not specifically illustrated, a detection device that detects movement in the virtual space or the instruction input by the player 11 for an operation of a virtual object may be included. Examples of the detection device include a device that is mounted on the player 11 and detects the motion of the player 11 by an acceleration sensor or a gyro sensor built in the device, and a device that is installed in a position separated from the player 11 and recognizes the motion of the player 11 as an image using an infrared sensor or a camera.

Further, the system 1 does not need to include all the configuration elements illustrated in FIG. 2, and can have a configuration in which a part of the configuration elements is omitted or a configuration to which another configuration element is added. Further, in the example of FIG. 2, the real space camera 200 and the display 300 are provided separately from the terminal device 100. However, the real space camera 200 and the display 300 can be provided as ones of the configuration elements of the terminal device 100.

3. Configuration of Terminal Device 100

The terminal device 100 includes a processor 111, a memory 112, a communication interface 113, an input interface 114, and an I/O port 115. Then, these configuration elements are electrically connected with one another through a control line and a data line.

The processor 111 is configured from a CPU (microcomputer), and functions as a control unit that controls connected other configuration elements on the basis of various programs stored in the memory 112. The processor 111 processes instruction commands stored in the memory 112, that is, a program for executing the application according to the present embodiment and a program for executing an OS. Specifically, the processor 111 executes various types of processing associated with execution of the game application that displays the virtual space, in cooperation with the head mounted display 400 and the detection device (not illustrated) that detects an instruction input of the player 11. Further, the processor 111 executes processing of controlling the real space camera 200 to generate the real space image. Further, the processor 111 executes processing of compositing the real space image acquired by the real space camera 200 and the virtual space image virtually imaged by the virtual camera 600. Further, the processor 111 executes processing of outputting the composite image to the display 300.

Note that the processor 111 may be configured from a single CPU. However, the processor 111 may be configured from a plurality of CPUs. Further, the processor 111 may be configured from an appropriate combination of other types of processors such as a GPU dedicated to image processing. Further, the processor 111 processes the instruction commands stored in the memory 112. However, for example, the terminal device 100 may include a drive device capable of reading an optical disk or a cartridge in which the programs for executing the application according to the present embodiment is stored, and the processor 111 may execute the programs stored therein.

The memory 112 includes a RAM, a ROM, or a nonvolatile memory (in some cases, an HDD), and functions as a storage unit. The ROM stores the instruction commands for executing the application according to the present embodiment and the OS as programs. The RAM is a memory used to write and read data while the programs stored in the ROM are processed by the processor 111. The nonvolatile memory is a memory in which write and read of data are executed by execution of the programs, and the data written here is stored after the execution of the programs is terminated. In the memory 112, as an example, drawing data such as the virtual objects constituting the virtual space, player information of the player who executes the game application, game information such as scores as a result of execution of the game application, a program for executing the game application, a program for executing processing of compositing and outputting the real space image and the virtual space image, image data of the real space image captured by the real space camera 200 (data such as a color value and a depth value of each pixel), image data of the virtual space image virtually captured by the virtual camera 600, and the like are appropriately updated and stored. Although not specifically illustrated, an optical disk or a cartridge in which the various types of information described as examples are stored can be externally installed and used as a storage unit.

The communication interface 113 includes a wireless communication processing circuit and an antenna connected to the wireless communication processing circuit, and functions as a communication unit. The communication interface 113 transmits and receives the programs necessary for execution of the game application according to the present embodiment, user information, result information of execution of the game application, and the like to and from a server device (not illustrated) connected via a network. Further, the communication interface 113 transmits and receives game information, control information, drawing data, player information, and the like necessary for execution of the game application to and from the head mounted display 400. The wireless communication processing circuit performs processing such as modulation and demodulation of the information to be transmitted and received.

The communication interface 113 performs processing by a broadband wireless communication system represented by a wideband-code division multiple access (W-CDMA) system. However, the processing can be performed on the basis of a system related to a wireless LAN represented by IEEE802.11 or narrowband wireless communication such as Bluetooth (registered trademark). Further, the communication interface 113 can use wired communication in place of or in addition to the wireless communication. In this case, a communication processing circuit for wired communication may be provided in place of or in addition to the wireless communication processing circuit.

The input interface 114 includes a touch panel and/or a hard key, and receives various instruction inputs form the user. For example, the input interface 114 is used in performing various settings and the like necessary for compositing the virtual space image and the real space image.

The I/O port 115 is connected to each of I/O ports included in the real space camera 200 and the display 300, and serves as an information input/output unit for inputting/outputting information to/from the real space camera 200 and the display 300. Specifically, the I/O port 115 functions as an interface for receiving the real space image imaged by the real space camera 200 and outputting image data to be displayed on the display 300. Note that, as the I/O port 115, a known connection system such as a serial port, a parallel port, or a USB can be adopted at the request.

As an example of the terminal device 100, any terminal device is adoptable as long as the terminal device can communicate with the real space camera 200, the display 300, and the head mounted display 400 and can execute the game application according to the present embodiment, such as a stationary game machine, an arcade game machine, a desktop personal computer, a laptop personal computer, a portable game machine, and a smartphone.

Further, in the example of FIG. 2, only one terminal device 100 is described. However, it goes without saying that the configuration elements may be distributed in a plurality of terminal devices or processing may be executed in a distributed manner. Further, the terminal device 100 may be exclusively for executing the game application according to the present embodiment. However, the terminal device 100 may be able to execute other functions.

4. Configuration of Real Space Camera 200

The real space camera 200 includes a real space color camera 211 for capturing the real space color image, a real space depth camera 212 for capturing the real space depth image, and an I/O port 213. Then, these configuration elements are electrically connected with one another through a control line and a data line.

The real space color camera 211 includes a known image sensor such as a CCD image sensor or a CMOS image sensor. The real space color camera 211 receives light from a subject for each constituent pixel with a photodiode or the like, photoelectrically converts the light into the amount of electric charge, and sequentially reads and converts the charges into an image signal, thereby to generate the real space color image constituted by a plurality of pixels. The real space color image captured by the real space color camera 211 includes red, blue, and green subpixels for each pixel, as an example, and the brightness and shading (shade, tint, tone, or gradation) of the color of each subpixel are generated as color values for each pixel and are stored in the memory 112.

The real space depth camera 212 includes a known depth sensor such as an infrared sensor. The real space depth camera 212 measures a value corresponding to a distance to an imaging target as the subject for each constituent pixel. The measured depth value is stored in the memory 112 for each pixel.

The I/O port 213 is connected to the I/O port 115 of the terminal device 100, and transmits image data of the real space image including the real space color image and the real space depth image captured by the real space camera 200 to the terminal device 100 and receives the control information of the real space camera 200 from the terminal device 100.

Note that the real space camera 200 does not need to include all the configuration elements illustrated in FIG. 2, and can have a configuration in which a part of the configuration elements is omitted or a configuration to which another configuration element is added. For example, although not specifically illustrated, the real space camera 200 appropriately includes a processor for controlling capture on the basis of the control information from the terminal device 100, a memory for storing captured image data, a communication interface for communicating with other devices including the terminal device 100.

Further, in the present embodiment, the case in which the real space camera 200 includes the real space color camera 211 and the real space depth camera 212 has been described. However, it is not necessary to have both of the cameras as long as the depth value of each pixel can be measured in addition to the real space color image. For example, the depth value may be measured by a known method using only the real space color camera 211, such as by measuring the depth value using a stereo color camera. A depth value may be measured using a monochrome stereo camera instead of the real space depth camera 212.

5. Configuration of Display 300

The display 300 includes an I/O port 311 and the display panel 312, and these configuration elements are electrically connected to each other via a control line and a data line. The I/O port 311 is connected to the I/O port 115 of the terminal device 100 and the I/O port 213 of the real space camera 200, and receives the image generated by the terminal device 100 and the image captured by the real space camera 200, and the like. Further, the display panel 312 functions as a display unit that displays the received image. As an example, the display panel 312 is configured from a liquid crystal display panel or an organic EL panel. Although not specifically illustrated, the display panel 312 includes a processor and a memory as appropriate.

6. Configuration of Head Mounted Display 400

The head mounted display 400 includes a processor 411, a memory 412, a display 413, and a communication interface 414, and these configuration elements are electrically connected to one another via a control line and a data line. The head mounted display 400 receives the image data for displaying the virtual space on the display 413 via the communication interface 414, stores the image data in the memory 412, processes the image data by the processor 411, and displays the image data on the display 413.

7. Processing Flow Executed in System 1

Figure 3:
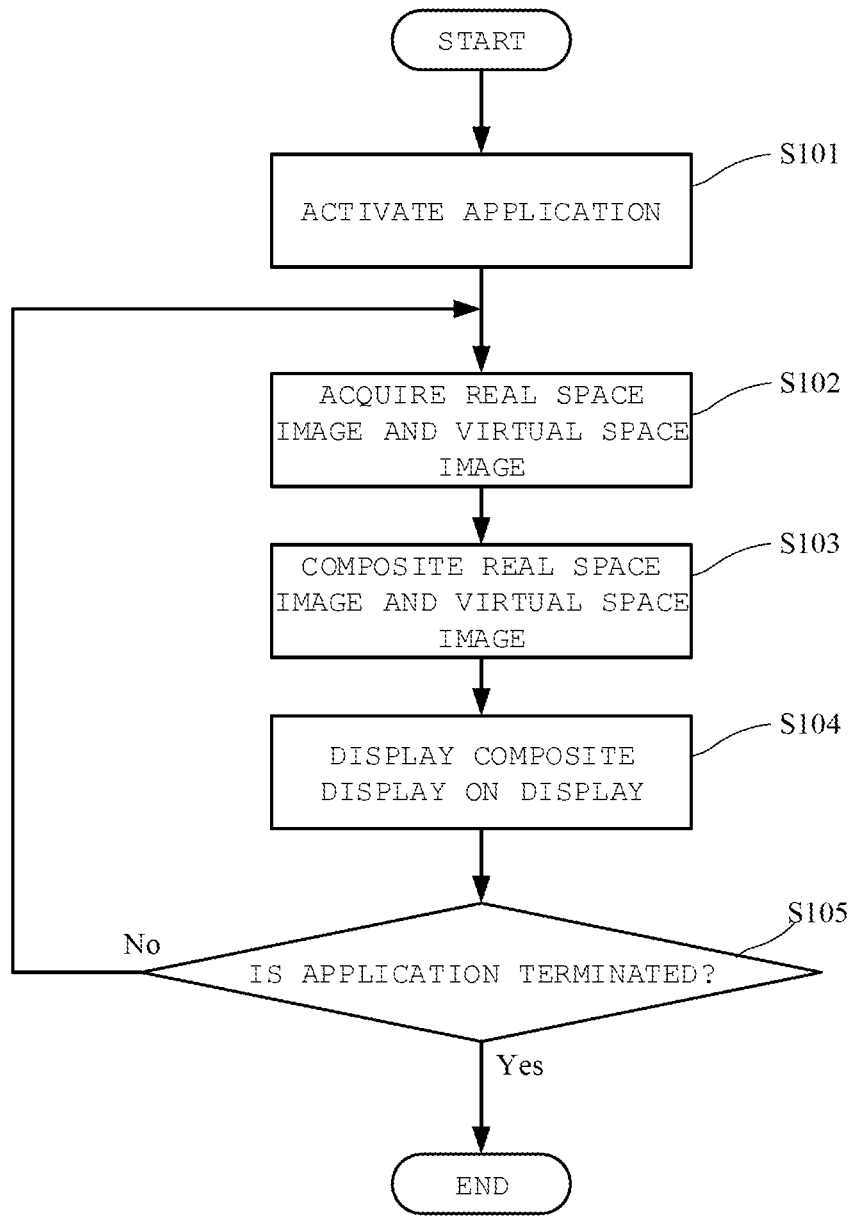
FIG. 3 is a diagram illustrating a processing flow executed in the system 1 according to an embodiment of the present disclosure.

FIG. 3 is a diagram illustrating a processing flow executed in the system 1 according to an embodiment of the present disclosure. Specifically, the processing flow illustrated in FIG. 3 is a processing flow started when the game application according to the present embodiment is activated on the terminal device 100. The processing flow is performed by the processor 111 by reading and executing the instruction command (program) stored in the memory 112 in cooperation with the real space camera 200, the display 300, and the head mounted display 400.

According to FIG. 3, the processing flow is started when an instruction input of activation of the game application by the player 11 is detected in the input interface 114 or the detection device (not illustrated) (S101). Thereafter, the processor 111 controls the real space camera 200 to acquire the real space image including the player 11 captured by the real space camera 200 and to store the real space image in the memory 112 (S102). In synchronization with the processing, the processor 111 virtually captures the virtual space displayed on the head mounted display 400 by the virtual camera 600 and acquires the virtual space image (S102). Next, the processor 111 extracts the player image of the player 11 from the real space image stored in the memory 112, and composites the virtual space image and the extracted player image (S103). Note that the image of the player 11 is extracted on the basis of the depth value measured for each pixel constituting the real space depth image and the color value of the real space color image. Then, the processor 111 outputs the composite image to the display 300, and controls the display 300 to display the image on the display 300 (S104). Next, the processor 111 determines whether an instruction input for termination of the game application by the player 11 has been detected, and when the instruction input has not been detected, the processor 111 repeats the processing of S102 to S104 at predetermined intervals (for example, every 30 milliseconds) (S105). On the other hand, when the instruction input for termination of the game application has been detected, the processor 111 terminates the execution of the application. Note that S102 to S104 will be described in more detail in FIG. 4, and the like.

8. Processing Flow Executed in Terminal Device 100

Figure 4:
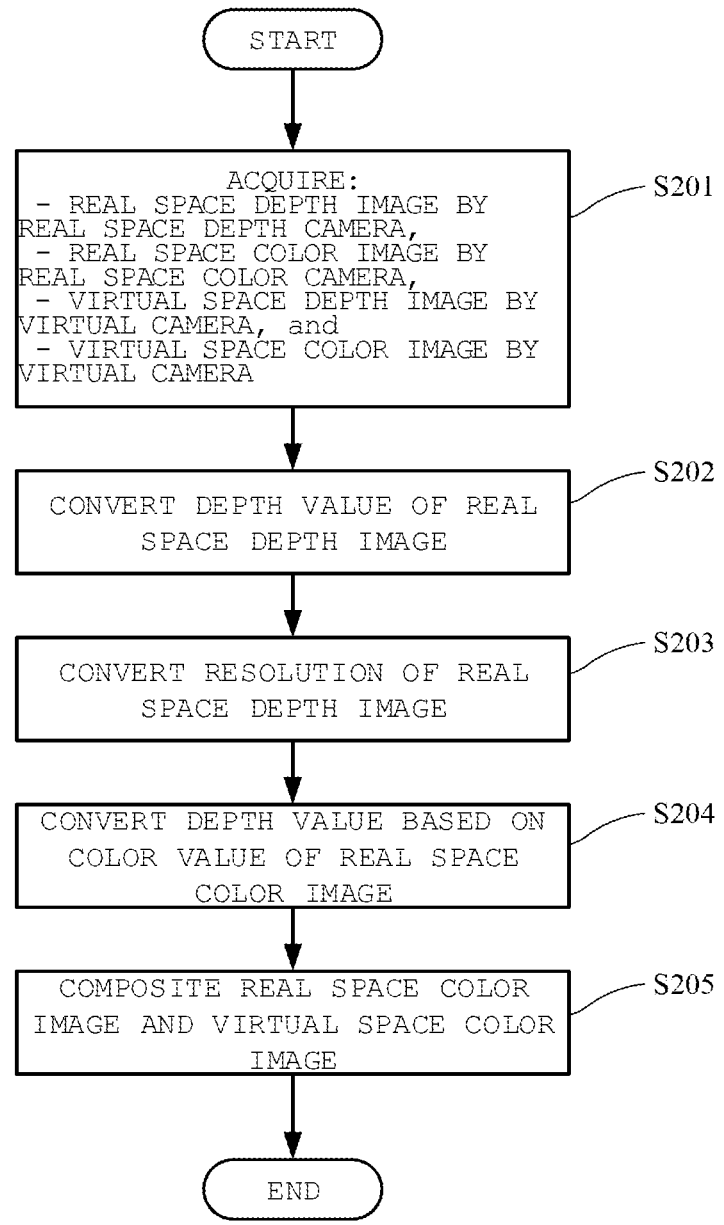
FIG. 4 is a diagram illustrating a processing flow executed in a terminal device 100 according to an embodiment of the present disclosure.

FIG. 4 is a diagram illustrating a processing flow executed in a terminal device 100 according to an embodiment of the present disclosure. Specifically, the processing flow illustrated in FIG. 4 is a processing flow regarding composite of the real space image and the virtual space image. The processing flow is performed by the processor 111 by reading and executing the instruction command (program) stored in the memory 112 in cooperation with the real space camera 200, the display 300, and the head mounted display 400

According to FIG. 4, first, the processor 111 acquires the real space depth image captured by the real space depth camera 212 and the real space color image captured by the real space color camera 211 and stores the images in the memory 112, and generates and stores the virtual space depth image and the virtual space color image virtually captured by the virtual camera 600 in the memory 112 (S201). In the present embodiment, the real space depth image, the real space color image, the virtual space depth image, and the virtual space color image are captured by the real space camera 200 or the virtual camera 600 in synchronization with one another, that is, at the same or substantially the same timing.

Figure 5A:
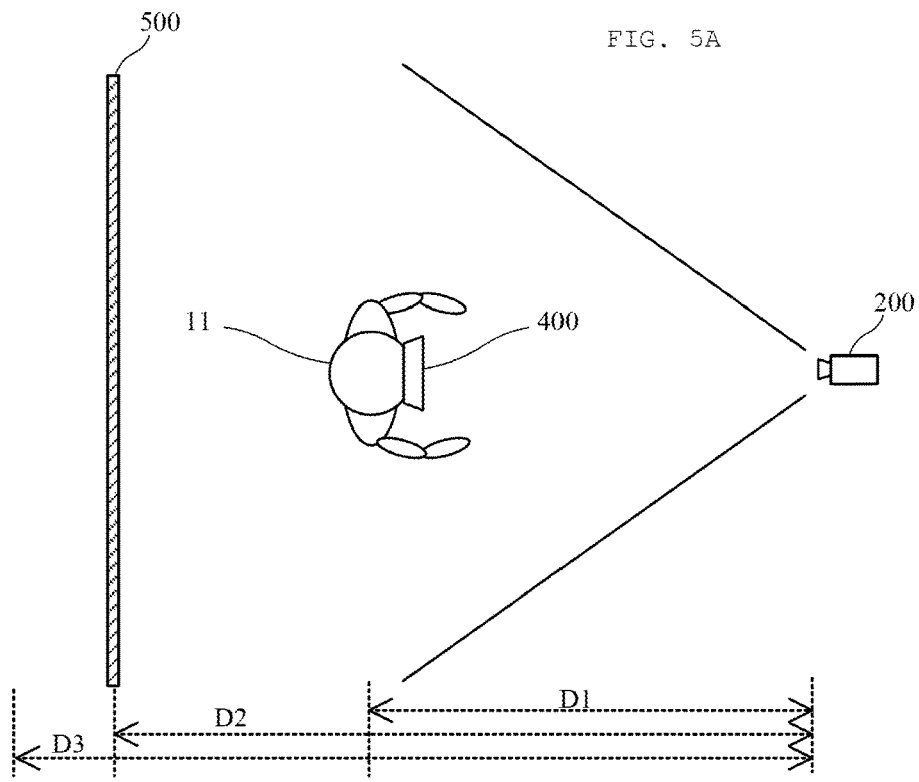
FIG. 5A is a diagram conceptually describing capture of a real space by a real space camera 200 according to an embodiment of the present disclosure. Further.

FIG. 5A is a diagram conceptually describing capture of the real space by the real space camera 200 according to an embodiment of the present disclosure. Specifically, FIG. 5A is a diagram for describing a state in which the player 11 and a background cloth 500 to be used for chroma key compositing are captured by the real space color camera 211 and the real space depth camera 212. According to FIG. 5A, the player 11 mounting the head mounted display 400 performs a movement in the virtual space displayed on the head mounted display 400 and an instruction input to the virtual object arranged in the virtual space. Behind the player 11, the background cloth 500 as a part of the background when the image imaged by the real space color camera 211 is arranged. That is, the player 11 exists at a distance D1 (for example, 2 m) from the real space camera 200, and the background cloth 500 is arranged at a distance D2 (for example, 4 m) that is equal to or more than the distance D1 from the real space camera 200 with respect to the real space camera 200. The real space camera 200 captures such a real space at appropriate timing (for example, every 30 milliseconds).

Note that, as the background cloth 500, background cloth used for chroma key compositing is favorably used. As an example, what is referred to as so-called greenback or blueback, which is green or blue over the entire surface, is used. Further, the material is not particularly limited to cloth, and for example, a plate-like wall material or the like can also be used. Further, in this embodiment, as will be described in detail below, the depth value is used in combination for the extraction of the player 11 from the captured real space image, and thus only an area around the player 11 needs green or blue background. Therefore, a wide range such as used in conventional chroma key compositing does not need to be covered with green or blue, and it is sufficient that a narrow range only around the player 11 is the green or blue background.

Figure 5B:
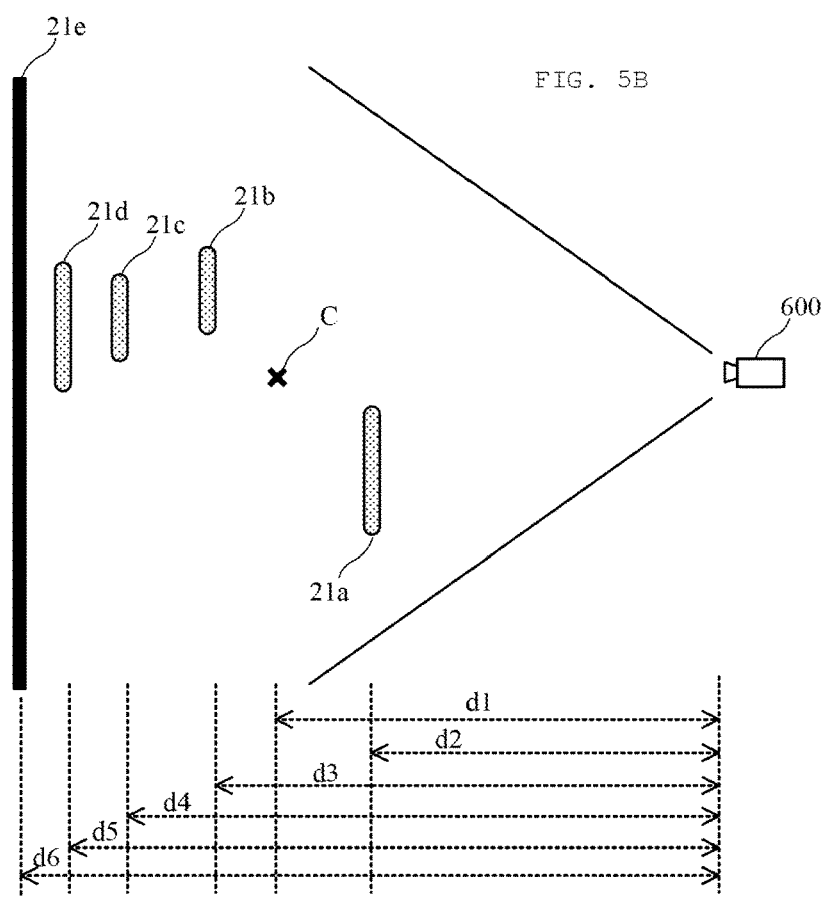
FIG. 5B is a diagram conceptually describing capture of a virtual space by a virtual camera 600 according to an embodiment of the present disclosure.

FIG. 5B is a diagram conceptually describing capture of the virtual space by the virtual camera 600 according to an embodiment of the present disclosure. Specifically, FIG. 5B is a diagram for describing a state in which the virtual space is captured by the virtual camera 600. According to FIG. 5B, the virtual camera 600 is arranged in the virtual space in association with the position where the real space camera 200 is arranged in the real space. That is, in the real space, the player 11 exists at the position of a coordinate C, and the virtual camera 600 is arranged at a position separated by a distance d1 corresponding to the distance D1 in the real space. Then, the tree object 21a is virtually arranged at a coordinate position separated from the virtual camera 600 by a distance d2 short of the distance d1, the enemy object 21b is virtually arranged at a coordinate position separated by a distance d3 larger than the distance d1, the enemy object 21c is virtually arranged at a coordinate position separated by a distance d4, the cloud object 21d is virtually arranged at a coordinate position separated by a distance d5, and the background object 21e at a coordinate position separated by a distance d6, on a coordinate space with the position of the virtual camera 600 as the origin. The virtual camera 600 virtually captures such a virtual space in synchronization with, that is, at the same or substantially same timing with the capture of the real space camera. Note that, in FIG. 5B, for convenience of description, the virtual objects 21a and the like are drawn in the form of a thin plate. However, actual virtual objects may be formed as three-dimensional objects having thicknesses in the up-down direction and the front-rear direction. In addition, the distances to the respective virtual object have been described as d2 to d6. However, as will be described below, the distance can be calculated for each pixel constituting each virtual object.

Figure 6A:
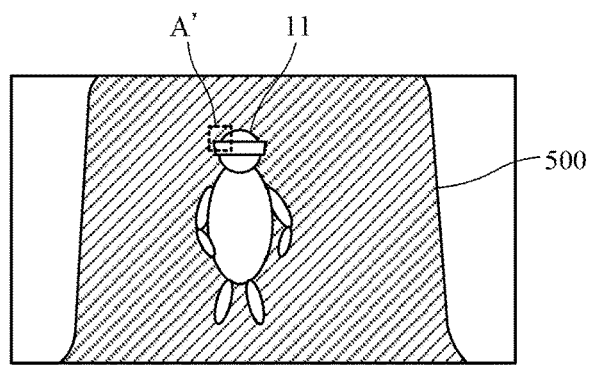
FIG. 6A is a diagram illustrating an example of a real space image captured by the real space camera 200 according to an embodiment of the present disclosure.

FIG. 6A is a diagram illustrating an example of the real space image captured by the real space camera 200 according to an embodiment of the present disclosure. Specifically, FIG. 6A illustrates the real space color image captured by the real space color camera 211 of the real space camera 200. In the real space color image, color values corresponding to wavelengths of light reflected from objects to be captured including the player 11 and the background cloth 500 in the real space are stored on a pixel to pixel basis. Therefore, respective colors of the player 11 and the background cloth 500 (the greenback in the present embodiment) are reproduced on a pixel to pixel basis.

Figure 6B:
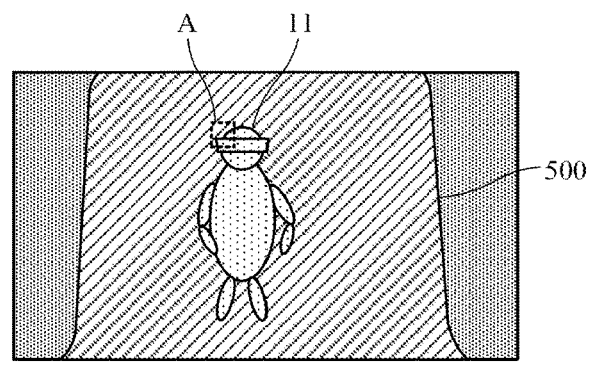
FIG. 6B is a diagram illustrating an example of the real space image captured by the real space camera 200 according to an embodiment of the present disclosure.

FIG. 6B is a diagram illustrating an example of the real space image captured by the real space camera 200 according to an embodiment of the present disclosure. More specifically, FIG. 6B illustrates the real space depth image captured by the real space depth camera 212 of the real space camera 200. The real space depth camera 212 is arranged at substantially the same position as the real space color camera 211 and captures the image in synchronization with the capture of the real space color camera 211. Therefore, the same scene is captured at substantially the same angle of view as the real space color camera 211. Therefore, the real space depth image includes the player 11 and the background cloth 500.

Meanwhile, the real space depth image has the depth value measured by the real space depth camera 212 for each pixel constituting the real space depth image. Note that the real space depth image in FIG. 6B and the like and the virtual space depth image in FIG. 6D and the like are drawn in gradations corresponding to the depth values (for example, in two gradations where the depth value zero is in white and the depth value in maximum is in black) for convenience of description. That is, the depth value corresponding to the distance D1 is stored in each pixel existing at the coordinates of the player 11 existing at the distance D1 from the real space depth camera 212, and the player 11 is drawn in the gradation corresponding to the depth value. Further, the depth value corresponding to the distance D2 is stored in each pixel existing at the coordinates of the background cloth 500 arranged at the distance D2 from the real space depth camera 212, and the background cloth 500 is drawn in the gradation corresponding to the depth value. For convenience of explanation, the depth values of the pixels constituting the player 11 are uniformly the distance D1. However, since the player 11 is actually a three-dimensional object having a depth, each pixel constituting the player 11 has a different depth value.

Figure 6C:
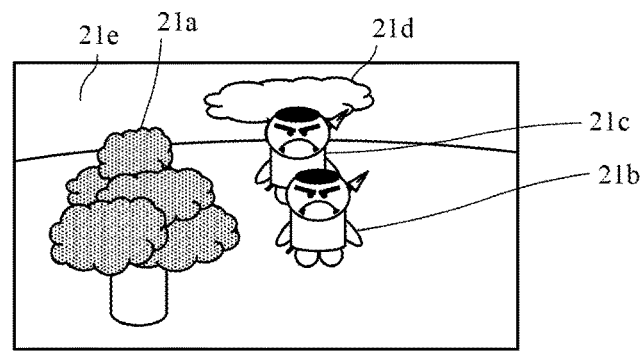
FIG. 6C is a diagram illustrating an example of a virtual space image captured by the virtual camera 600 according to an embodiment of the present disclosure. Further.

FIG. 6C is a diagram illustrating an example of the virtual space image captured by the virtual camera 600 according to an embodiment of the present disclosure. More specifically, FIG. 6C illustrates the virtual space color image virtually captured by the virtual camera 600. The virtual camera 600 is arranged at a position corresponding to the real space camera 200 and captures the image in synchronization with the capture of the real space camera 200. Therefore, the virtual space is captured at substantially the same angle of view as the real space color camera 211. Therefore, the virtual space color image includes the virtual space and the background object 21e, the cloud object 21d, the enemy object 21c, the enemy object 21b, and the tree object 21a arranged at the predetermined coordinate positions in the virtual space. Various types of attribute information such as a color, a size, a position in the virtual space, and an orientation in the virtual space are stored in advance as object information for all the virtual objects including the virtual objects 21a to 21e constituting the virtual space. Therefore, the virtual space color image is reproduction of the scene captured by the virtual camera 600 on a pixel to pixel basis on the basis of the color values held by the virtual objects.

Figure 6D:
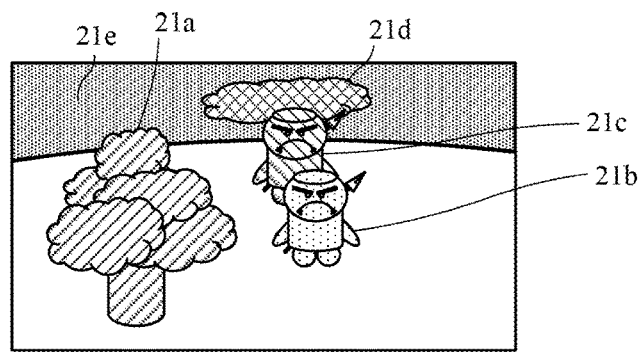
FIG. 6D is a diagram illustrating an example of the virtual space image captured by the virtual camera 600 according to an embodiment of the present disclosure.

FIG. 6D is a diagram illustrating an example of the virtual space image captured by the virtual camera 600 according to an embodiment of the present disclosure. More specifically, FIG. 6D illustrates the virtual space depth image virtually captured by the virtual camera 600. As described above, the various types of attribute information such as a color, a size, a position in the virtual space, and an orientation in the virtual space are stored in advance as the object information for all the virtual objects including the virtual objects 21a to 21e constituting the virtual space. Therefore, by converting each virtual object in the virtual space into a camera coordinate system having the virtual camera 600 as the origin on the basis of the attribute information, the distance from the position of the virtual camera 600 is calculated. Then, by projection-converting each virtual object from the position of the virtual camera 600 onto the virtual screen, the distance from the virtual camera 600 is calculated for each pixel constituting the virtual space depth image. FIG. 6D is reproduction based on the depth value corresponding to the distance from the virtual camera 600 calculated for each pixel.

Returning back to FIG. 4, when the real space images and the virtual space images illustrated in FIGS. 6A to 6D as examples are each obtained or generated, and stored in the memory 112, the processor 111 then performs processing of converting the depth values included in the real space depth image (S202).

Specifically, the depth value corresponding to the distance from the real space depth camera 212 is stored for each pixel constituting the real space depth image. In the processing, in a case the depth value is larger than a threshold, processing of converting the depth value into a depth value indicating infinity (that is, a theoretical maximum depth value (for example, in a case where a range of 0 to 10 m is expressed by 16-bit depth values of 0 to 65535, the depth value of "65535" is set for all behind 10 m)) and storing the depth value is performed. In the present embodiment, as the predetermined value, a value corresponding to a distance D3 that is farther than the player 11 and the background cloth 500 is set. Therefore, the depth values of all the pixels for which depth values equal to or larger than the predetermined value corresponding to the distance D3 are converted into the depth value indicating infinity and stored. Meanwhile, since the depth values less than the depth value corresponding to the distance D3 are stored for the pixels constituting the player 11 and the background cloth 500, the depth values are not converted.

Figure 7:
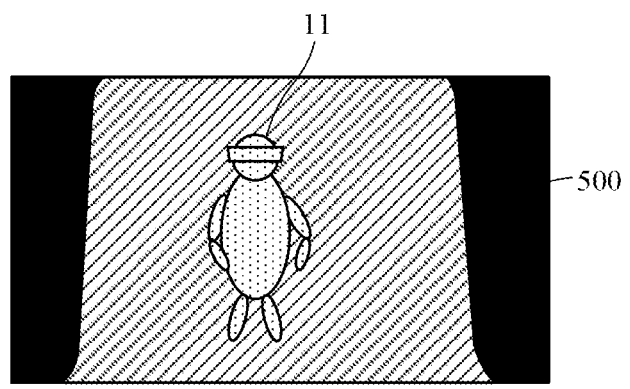
FIG. 7 is a diagram illustrating an example of a real space depth image according to an embodiment of the present disclosure.

FIG. 7 is a diagram illustrating an example of the real space depth image according to an embodiment of the present disclosure. Specifically, FIG. 7 is a diagram after the depth value conversion processing of S202 is performed for the real space depth image illustrated in FIG. 6B. As described above, in the area farther than the distance D3, the depth values have been converted into the depth value indicating infinity, and thus the area is drawn in black indicating infinity. Meanwhile, in the area closer than the distance D3, the depth values are not converted from the measured depth values, and the area is drawn in the gradations corresponding to the original depth values.

Referring back to FIG. 4, after the depth value conversion processing of the real space depth image is performed, the processor 111 performs processing of converting the resolution of the real space depth image (S203). Typically, the resolution of the real space depth camera 212 is lower than the resolution of the real space color camera 211. That is, the real space depth image illustrated in FIG. 6B is captured at a relatively low resolution (first resolution) by the real space depth camera 212, and the real space color image illustrated in FIG. 6A is captured at a second resolution higher than the first resolution by the real space color camera 211. Therefore, when the image of the player 11 is extracted on the basis of the real space depth image that is unchanged from what has been captured, an unnecessary area such as the area where the background cloth 500 is displayed is extracted as the image of the player 11 in the real space color image. Therefore, to minimize clipping of such an unnecessary area and to more vividly extract the image of the player 11, processing of converting the resolution of the real space depth image in S203 of the present embodiment is necessary. In the present embodiment, for example, the real space color camera 211 has a resolution four times as large as the resolution of the real space depth camera 212. Therefore, in this conversion processing, the resolution of the real space depth image is converted into a quadruple resolution corresponding to the resolution of the real space color camera 211. In the present embodiment, the resolution is set to the quadruple resolution for convenience of description. However, the resolution can appropriately set according to the resolutions of the real space color camera 211 and the real space depth camera 212 to be used.

Figure 8A:
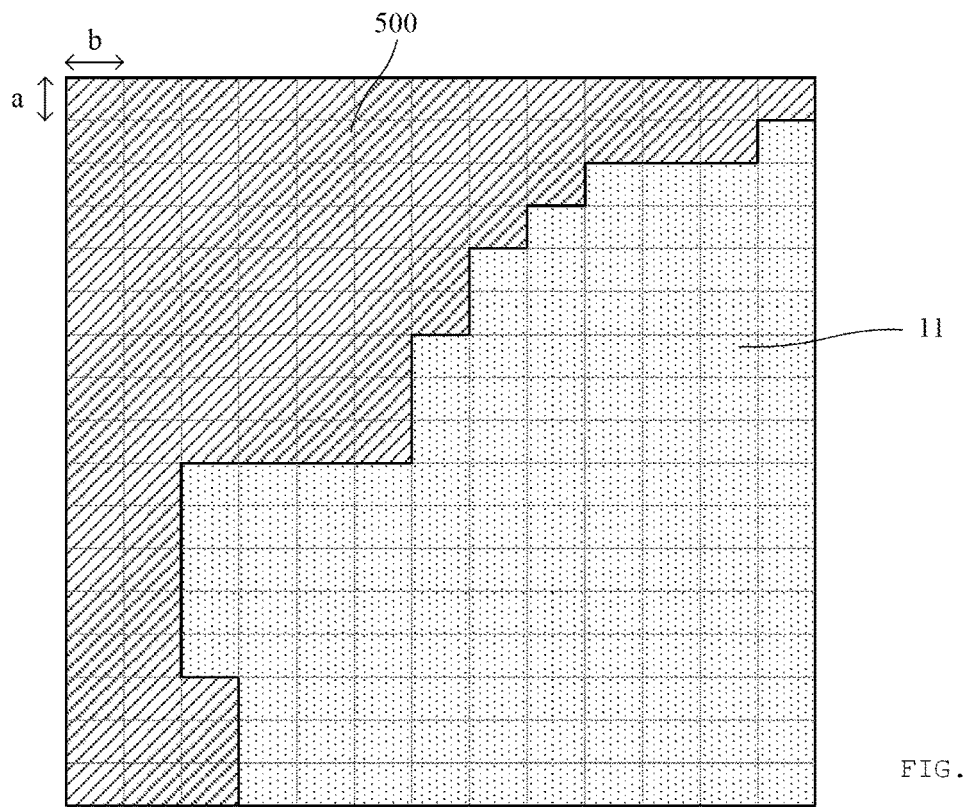
FIG. 8A is a diagram illustrating an example of the real space depth image according to an embodiment of the present disclosure. Further.

FIG. 8A is a diagram illustrating an example of the real space depth image according to an embodiment of the present disclosure. Specifically, FIG. 8A is an enlarged diagram of an area A of the real space depth image in FIG. 6B, illustrating an image before the resolution conversion processing in S203 is executed. According to FIG. 8A, the real space depth image is constituted by pixels each having the size of a×b.

Figure 8B:
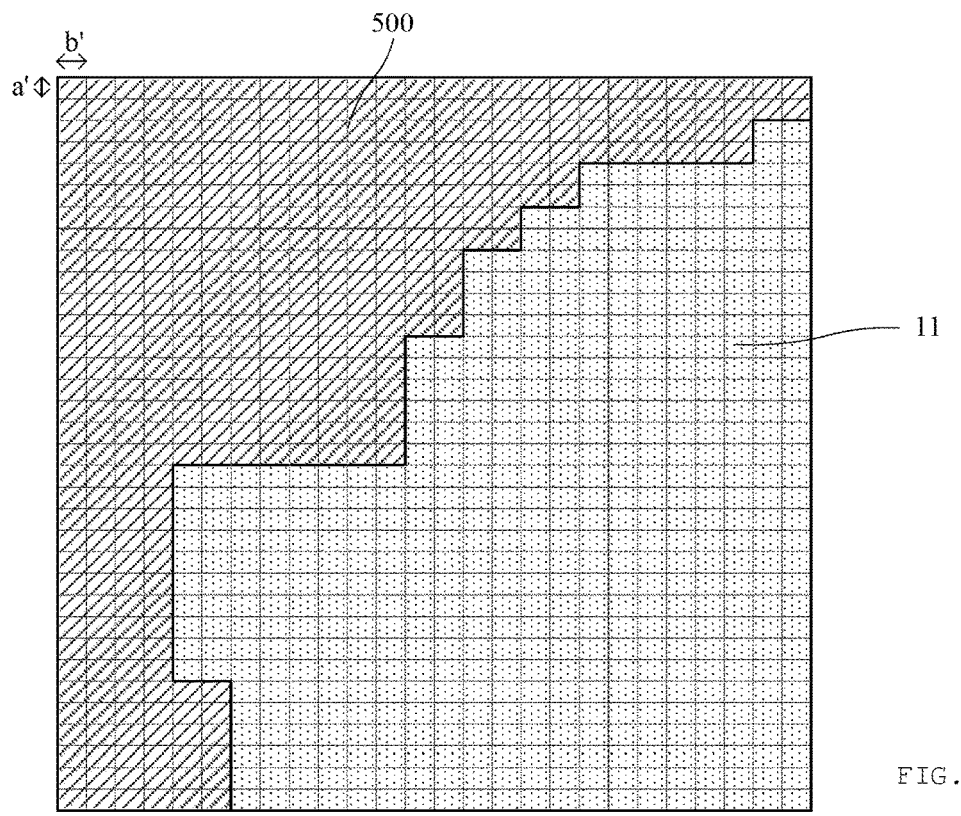
FIG. 8B is a diagram illustrating an example of the real space depth image according to an embodiment of the present disclosure.

FIG. 8B is a diagram illustrating an example of the real space depth image according to an embodiment of the present disclosure. Specifically, FIG. 8B illustrates an image after the resolution conversion processing in S203 is executed. In the present embodiment, as described above, the processing of converting the resolution into the quadruple resolution corresponding to the resolution of the real space color camera 211 is executed. Therefore, according to FIG. 8B, each pixel is refined to have half the length (a'×b') in both the length and width. In each pixel after the resolution conversion processing, the depth value that was held by each pixel before the processing is stored as it is.

Referring back to FIG. 4, after the processing of converting the resolution of the real space depth image is performed, the processor 111 performs processing of converting the depth value on the basis of the color value of the real space color image (S204). Specifically, processing of converting the depth value of the pixel of the real space depth image located at the same coordinate position as the pixel having the color value of the color (in this embodiment, green) of the background cloth 500 in the real space color image into the depth value indicating infinity.

Figure 9A:
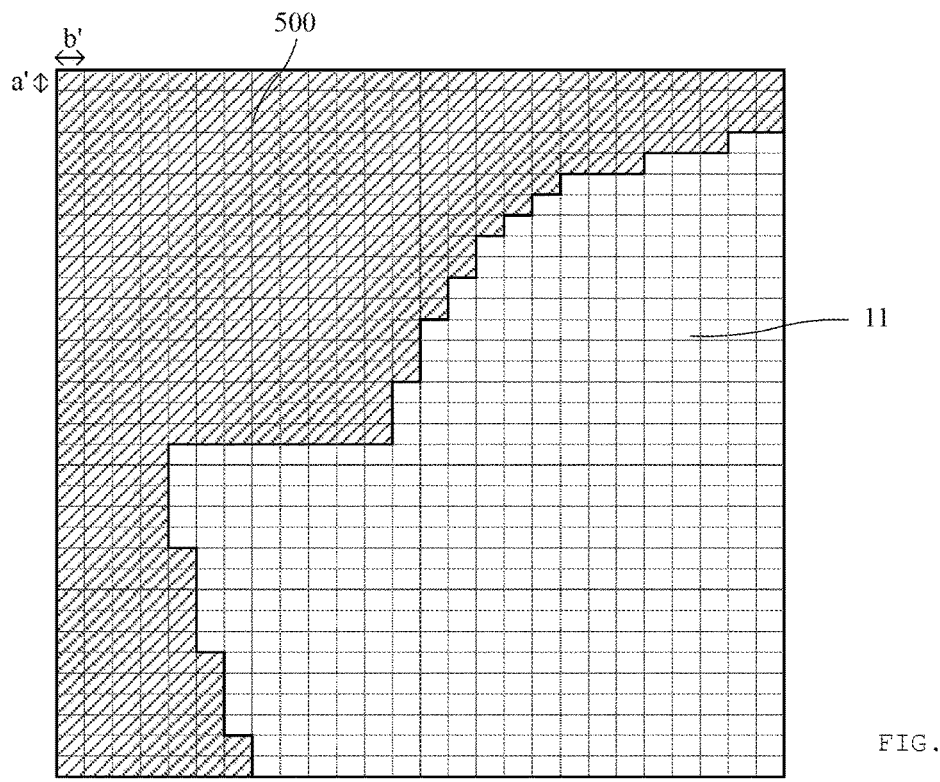
FIG. 9A is a diagram illustrating an example of a real space color image according to an embodiment of the present disclosure.

FIG. 9A is a diagram illustrating an example of the real space color image according to an embodiment of the present disclosure. Specifically, FIG. 9A is an enlarged diagram of an area A' of the real space color image of FIG. 6A. According to FIG. 9A, the real space color image including the image of the player 11 and the image of the background cloth 500 is drawn at the same resolution (one pixel is constituted in a'×b') as the real space depth image after the resolution conversion processing illustrated in FIG. 8B. Therefore, the boundary between the player 11 and the background cloth 500 is more finely drawn than the real space depth image illustrated in FIG. 8B.

Figure 9B:
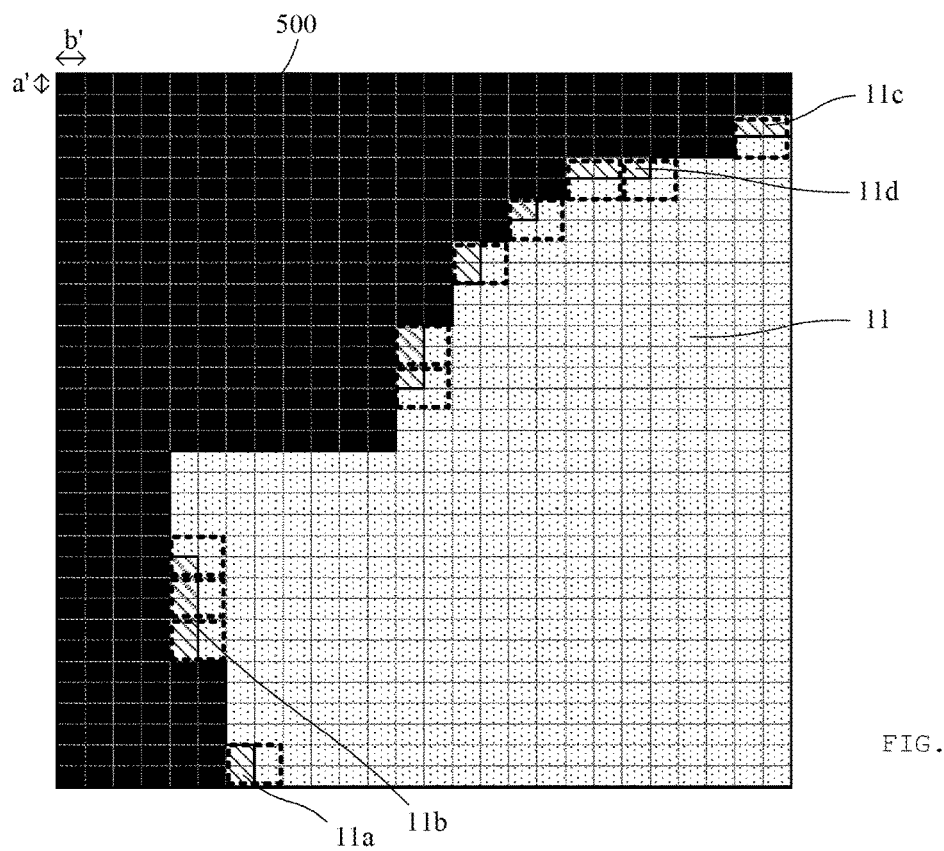
FIG. 9B is a diagram illustrating an example of the real space depth image according to an embodiment of the present disclosure. Further.

FIG. 9B is a diagram illustrating an example of the real space depth image according to an embodiment of the present disclosure. Specifically, FIG. 9B is a diagram illustrating a difference in a boundary between the player 11 and the background cloth 500 in the real space depth image after the resolution conversion process illustrated in FIG. 8B and the real space color image in FIG. 9A. According to FIG. 9B, in the original real space depth image having a low resolution, the pixels of areas 11a to 11d and the like illustrated by the diagonally right lines have the same depth value as the other pixels of the player 11, are extracted as the player 11. However, in the real space color image (FIG. 9A) having a higher resolution, the pixels of areas 11a to 11d and the like illustrated by the diagonally right lines are not pixels extracted as the player 11 but pixels to be cut out as the background cloth 500. Therefore, if the image of the player 11 is extracted on the basis only on the original real space depth image having a low resolution, the background cloth 500 coexists in a part of a contour, resulting in an inferior appearance image. Therefore, in the present embodiment, the processing of converting all the depth values of the pixels of the real space depth image located at the same coordinate positions as the pixels having the color value of the color (in this embodiment, green) of the background cloth 500 in the real space color image into the depth value indicating infinity so as not to extract the area of the background cloth 500.

Figure 9C:
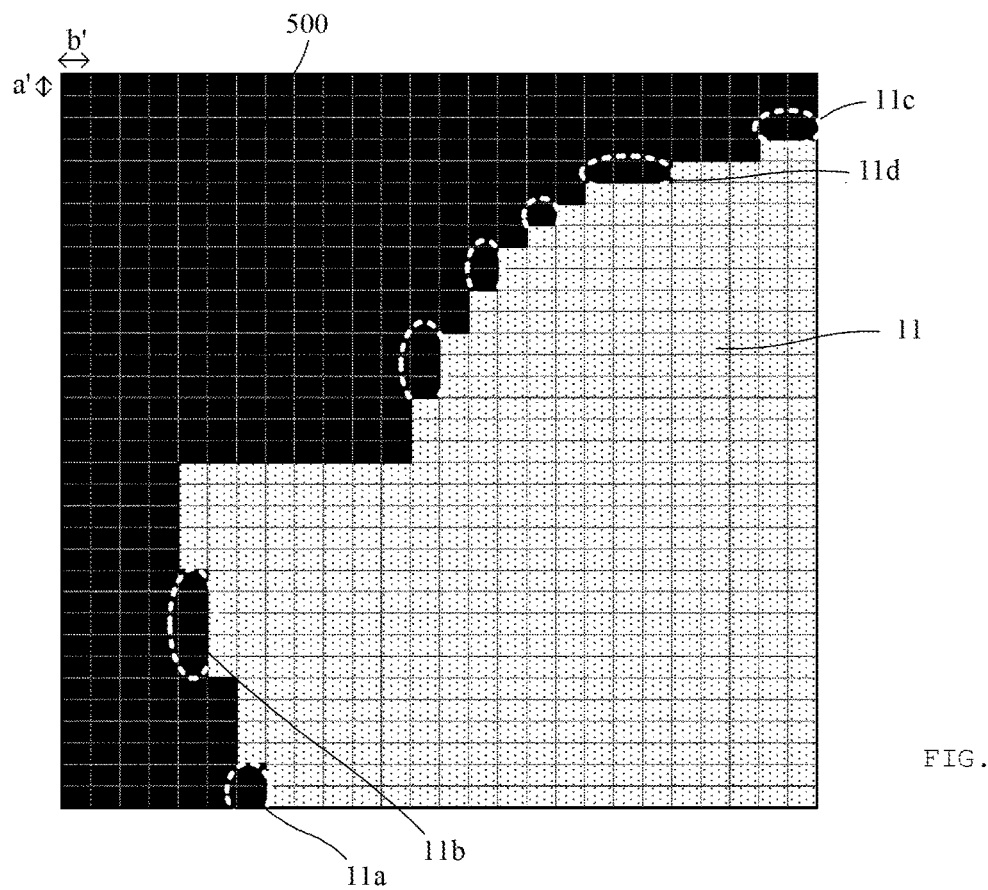
FIG. 9C is a diagram illustrating an example of the real space depth image according to an embodiment of the present disclosure.

FIG. 9C is a diagram illustrating an example of the real space depth image according to an embodiment of the present disclosure. Specifically, FIG. 9C is a diagram illustrating the real space depth image after the depth value conversion processing in S204. According to FIG. 9C, all the pixels illustrated by the diagonally right lines in FIG. 9B supposed to be cut out as the background cloth 500 are drawn in the gradation of black because the pixels are converted into the depth value indicating infinity. Therefore, in the real space depth image, the boundary between the player 11 and the background cloth 500 can be more finely drawn like the real space color image.

Referring back to FIG. 4, after the processing of converting the depth value of the real space depth image is performed, the processor 111 executes processing of compositing the real space color image and the virtual space color image (S205). Specifically, the depth values of the real space depth image after the processing of S204 and the virtual space depth image having the same resolution as the resolution of the real space depth image are compared on a pixel to pixel basis. Then, the color value of the color image having a smaller depth value is selected as the color value of that pixel. For example, in a case where the depth value of the pixel at the coordinate position (x1, y1) of the real space depth image is "2.0" and the depth value of the pixel at the corresponding coordinate position (x1, y1) in the virtual space depth image is "6.0", the color value of the pixel at the corresponding coordinate position (x1, y1) of the real space color image is adopted as the color value of the pixel at the corresponding coordinate position (x1, y1) of the composite image. On the other hand, in a case where the depth value of the pixel at the coordinate position (x2, y2) of the real space depth image is "infinity (theoretical maximum value)" and the depth of the pixel at the coordinate position (x2, y2) of the virtual space depth image is "1.0", the color value of the pixel at the coordinate position (x2, y2) of the virtual space color image is adopted as the color value of the pixel at the coordinate position (x2, y2) of the composite image. By repeating the above processing for all the pixels, the processing of compositing the real space color image and the virtual space color image is executed.

Figure 10:
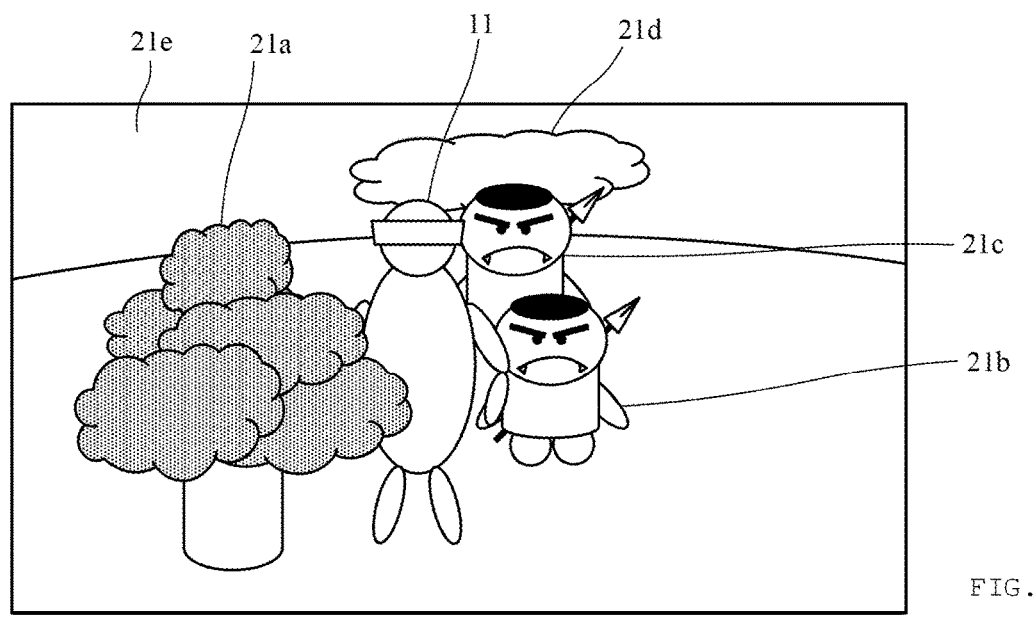
FIG. 10 is a diagram illustrating an example of a composite image according to an embodiment of the present disclosure.

FIG. 10 is a diagram illustrating an example of a composite image according to an embodiment of the present disclosure. Specifically, FIG. 10 illustrates an image after the real space color image and the virtual space color image are composited by the processor 111. By the processing of S202 to S204 of FIG. 4, the depth value of the entire area other than the player 11 is converted into the depth value indicating infinity. That is, in the virtual space illustrated in FIG. 5B, all the virtual objects including the virtual objects 21a to 21e having the depth values corresponding to the distances d2 to d6 always have smaller values than the depth value (infinity) of the area other than the player 11. Therefore, by adopting the color values of the virtual space color image in the area other than the player 11, the virtual objects including all the virtual objects 21a to 21e are drawn.

Meanwhile, in each pixel constituting the player 11, the distance from the real space depth camera 212 is stored as the depth value in pixel units (note that, in FIG. 5A and the like, the description has been made on the assumption that the depth value corresponding to the distance D1 is stored as the representative value). Then, for an area overlapping with the player 11, of the enemy object 21b, the enemy object 21c, the cloud object 21d, and the background object 21e having the depth value larger than the depth value stored in each pixel constituting the player 11, the color value of the real space color image is adopted, whereby the image of the player 11 is drawn in front. Further, for an area overlapping with the player 11, of the tree object 21a having the depth value smaller than the depth value stored in each pixel constituting the player 11, the color value of the virtual space color image is adopted, whereby the tree object 21a is drawn in front. Therefore, focusing on the real space image, only the image of the player 11 is extracted and drawn in the finally composited image.

As described above, in the present embodiment, the player who is wearing the head mounted display 400 and executing the game application in the virtual space and the virtual space are composited and displayed. Therefore, highly attractive display becomes possible for the third person who is watching the player 11 and his/her operation. Further, in the present embodiment, the image of the player 11 is extracted using both the depth value of the real space depth image and the color value of the real space color image. Therefore, highly fine extraction of the player 11 becomes possible than the extraction processing based only on the depth value of the real space depth image. Further, in the present embodiment, reproduction of the front-rear relationship between the virtual object in the virtual space and the player 11 captured by the real space camera 200 becomes possible in pixel units. Therefore, even if a real object other than the player 11 exists in the imaging range of the real space camera 200, such as in a case where there is a plurality of players to be extracted from the image captured by the real space camera 200 in addition to the player 11, or in a case where the player 11 holds a controller, determination can be made in the right front-rear relationship with the virtual objects in the virtual space. As an example, when an object in the real space exists between the player 11 and the real space camera 200 and at a position closer than the distance d2, the object can be drawn in front of the tree object 21a is there. On the other hand, in a case where the player 11 reaches the rear and reaches behind the enemy object 21b in the virtual space, the hand can be drawn behind the enemy object 21b. Further, the area where the background cloth 500 is installed can be minimized, as compared with the extraction processing (chroma key compositing processing) using only the color values of the real space color image.

9. Other Embodiments

In the above embodiment, the case where the composite image is output to the display 300 having a certain size and is viewed by all the third persons has been described. However, each of the third persons may wear head mounted displays and the composite image may be output to the head mounted displays.

Further, in the present embodiment, the case of using the system 1 for execution of the game application has been described. However, the system 1 is also favorably applicable to applications such as medical simulation, driving simulation of automobiles, trains, airplanes, etc., simulation of travel to tourist spots, virtual shopping in virtual shops and virtual real estate, entertainment such as movies and music lives.

The processing and the procedures described in the present specification are not limited to the explicitly described embodiments, and can be realized by software, hardware, or a combination of the software and the hardware. To be specific, the processing and procedures described in the present specification are realized by mounting a logic corresponding to the processing to a medium such as an integrated circuit, a volatile memory, a non-volatile memory, a magnetic disk, or an optical storage. Further, the processing and procedures described in the present specification can be mounted as a computer program and executed by various types of computers including a terminal device and a server device.

Even if description has been given such that the processing and procedures described in the present specification are executed by a single device, software, component, or module, the processing and procedures can be executed by a plurality of devices, pieces of software, components, or modules. Further, even if description has been given such that the various types of information described in the present specification are stored in a single memory or storage unit, such information can be distributed and stored in a plurality of memories included in a single device or a plurality of memories distributed and arranged in a plurality of devices. Further, the elements of software and hardware described in the present specification can be realized by being integrated into a smaller number of configuration elements or by being decomposed into a larger number of configuration elements.

The terminal device, system, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
an interface configured to communicate with an external device including a display and a real space camera that are disposed in a real space;
a sensor configured to detect an instruction input of a real player in the real space;
a memory configured to store computer-readable instructions; and
a processor configured to execute the computer-readable instructions so as to:
cause the real space camera to capture a real space image of a real space target including the real player, the real space image includes a real space color image and a real space depth image, each pixel of the real space color image having a color value, each pixel of the real space depth image having a depth value;
obtain the real space image via the interface so as to store the real space image in the memory;
cause a virtual space camera to capture a virtual space image of a virtual space target including a virtual object, the virtual space camera being disposed in a virtual space of a game application, the real player performing the instruction input to the virtual object, the virtual space image includes a virtual space color image and a virtual space depth image, each pixel of the virtual space color image having a corresponding color value that is stored in the memory, each pixel of the virtual space depth image has a corresponding depth value that is stored in the memory;
obtain the virtual space image via the interface so as to store the virtual space image in the memory;
convert each of the depth values of a first group of the pixels of the real space depth image to a predetermined depth value, the first group of the pixels being spaced apart from the real space camera by a first distance or more;
create a player image of the real player from the real space image by excluding the pixels having the predetermined depth values, the player image being stored in the memory;
create a composite image that is formed by composing part of the virtual space image stored in the memory and the player image stored in the memory; and
output the composite image to the display via the interface so that the display is configured to display the composite image,
wherein the processor is configured to synchronize the real space camera with the virtual space camera so that the real space image and the virtual space image are captured at a same time, and the processor is configured to start and end the game application in response to the detection of the instruction input of the real player by the sensor.

2. The terminal device according to claim 1, wherein the real space camera is configured to measure the depth value of each of the pixels of the real space depth image, and the real space camera is configured to generate the color value of each of the pixels of the real space color image.

3. The terminal device according to claim 1, wherein the depth value corresponds to a distance from the real space camera to part of an imaging target in the real space image corresponding to each of the pixels of the real space depth image.

4. The terminal device according to claim 1, wherein the color value corresponds to one of brightness and shade of a color of each of the pixels of the real space color image.

5. The terminal device according to claim 1, wherein the real space camera is configured to capture the real space depth image at a first resolution, and the real space camera is configured to capture the real space color image at a second resolution higher than the first resolution.

6. The terminal device according to claim 5, wherein the processor is configured to convert the first resolution of the real space depth image to the second resolution.

7. The terminal device according to claim 6, wherein when the processor determines that the color value of a first pixel of the pixels of the real space color image is a predetermined color value, the processor is configured to convert the depth value of a second pixel of the pixels of the real space depth image having the second resolution into the predetermined depth value that corresponds to an infinity value, and the first and second pixels are located at a same coordinate position.

8. The terminal device according to claim 1, wherein the processor is configured to compare the depth value for a first pixel of the pixels of the real space depth image and the depth value of a second pixel of the pixels of the virtual space depth image, and the first and second pixels are located at a same coordinate position, when the depth value of the first pixel of the real space depth image is smaller than the depth value of the second pixel of the virtual space depth image, the processor is configured to select the color value of a third pixel of the pixels of the real space color image as the color value of a fourth pixel of pixels of the composite image, and the first, second, third, and fourth pixels are located at the same coordinate position, and when the depth value of the second pixel of the virtual space depth image is smaller than the depth value of the first pixel of the real space depth image, the processor is configured to select the color value of a fifth pixel of the pixels of the virtual space color image as the color value of the fourth pixel of pixels of the composite image, and the first, second, third, fourth, and fifth pixels are located at the same coordinate position.

9. The terminal device according to claim 1, wherein the real space target further includes a background screen located at a rear side of the real player with respect to the real space camera, the background screen is spaced apart from the real space camera by a second distance that is shorter than the first distance, and wherein the processor is configured to:

determine a second group of the pixels of the real space color image that has the color value of the background screen; and convert each of the depth values of a third group of the pixels of the real space depth image to the predetermined depth value, the second group of the pixels and the third group of the pixels being located at a same coordinate position.

10. A system comprising:

a terminal device, the terminal device including:

an interface;

a memory configured to store computer-readable instructions; and a processor configured to execute the computer-readable instructions;

a sensor configured to detect an instruction input of a real player in a real space;

a real space camera arranged in the real space, communicatively connected with the terminal device via the interface, and configured to capture a real space image of a real space target including the real player in the real space, the real player performing the instruction input to a virtual object arranged in a virtual space of a game application; and a display communicatively connected with the terminal device via the interface and configured to display an image in which at least a part of a virtual space image of a virtual space target virtually imaged by a virtual camera arranged in the virtual space, wherein the processor is configured to:

cause the real space camera to capture the real space image, the real space image includes a real space color image and a real space depth image, each pixel of the real space color image having a color value, each pixel of the real space depth image having a depth value;

obtain the real space image via the interface so as to store the real space image in the memory;

cause the virtual space camera to capture the virtual space image of the virtual space target including the virtual object, the virtual space image includes a virtual space color image and a virtual space depth image, each pixel of the virtual space color image having a corresponding color value that is stored in the memory, each pixel of the virtual space depth image has a corresponding depth value that is stored in the memory;

obtain the virtual space image via the interface so as to store the virtual space image in the memory;

convert each of the depth values of a first group of the pixels of the real space depth image to a predetermined depth value, the first group of the pixels being spaced apart from the real space camera by a first distance or more;

create a player image of the real player from the real space image by excluding the pixels having the predetermined depth values, the player image being stored in the memory;

create a composite image that is formed by composing part of the virtual space image stored in the memory and the player image; and output the composite image to the display via the interface so that the display is configured to display the composite image, wherein the processor is configured to synchronize the real space camera with the virtual space camera so that the real space image and the virtual space image are captured at a same time, and the processor is configured to start and end the game application in response to the detection of the instruction input of the real player by the sensor.

11. The system according to claim 10, wherein the real space target further includes a background screen located at a rear side of the real player with respect to the real space camera, the background screen is spaced apart from the real space camera by a second distance that is shorter than the first distance, and wherein the processor is configured to:
  determine a second group of the pixels of the real space color image that has the color value of the background screen; and
  convert each of the depth values of a third group of the pixels of the real space depth image to the predetermined depth value, the second group of the pixels and the third group of the pixels being located at a same coordinate.

12. A non-transitory computer-readable storage medium having executable computer-readable instructions of a computer program stored thereon for causing a computer to execute a process by a processor, the computer configured to perform the steps of:

causing a sensor to detect an instruction input of a real player in a real space;

causing a real space camera to capture a real space image of a real space target including the real player, the real space camera being disposed in the real space, the real space image includes a real space color image and a real space depth image, each pixel of the real space color image having a color value, each pixel of the real space depth image having a depth value;

obtaining the real space image so as to store the real space image in a memory;

causing a virtual space camera to capture a virtual space image of a virtual space target including a virtual object, the virtual space camera being disposed in a virtual space of a game application, the real player performing the instruction input to the virtual object, the virtual space image includes a virtual space color image and a virtual space depth image, each pixel of the virtual space color image having a corresponding color value that is stored in the memory, each pixel of the virtual space depth image has a corresponding depth value that is stored in the memory;

obtaining the virtual space image so as to store the virtual space image in the memory;

converting each of the depth values of a first group of the pixels of the real space depth image to a predetermined depth value, the first group of the pixels being spaced apart from the real space camera by a first distance or more;

creating a player image of the real player from the real space image by excluding the pixels having the predetermined depth values, the player image being stored in the memory;

creating a composite image that is formed by composing part of the virtual space image stored in the memory and the player image; and outputting the composite image to a display so that the display is configured to display the composite image, wherein the processor is configured to synchronize the real space camera with the virtual space camera so that the real space image and the virtual space image are captured at a same time, and the processor is configured to start and end the game application in response to the detection of the instruction input of the real player by the sensor.

13. The non-transitory computer-readable storage medium according to claim 12, wherein the real space target further includes a background screen located at a rear side of the real player with respect to the real space camera, the background screen is spaced apart from the real space camera by a second distance that is shorter than the first distance, and wherein the processor is configured to:
  determine a second group of the pixels of the real space color image that has the color value of the background screen; and
  convert each of the depth values of a third group of the pixels of the real space depth image to the predetermined depth value, the second group of the pixels and the third group of the pixels being located at a same coordinate.

14. A method for causing a processor in a computer to execute a process, the computer including a memory configured to store computer-readable instructions, the method comprising executing the computer-readable instructions on the processor the steps of:

causing a sensor to detect an instruction input of a real player in a real space;

causing a real space camera to capture a real space image of a real space target including the real player, the real space camera being disposed in the real space, the real space image includes a real space color image and a real space depth image, each pixel of the real space color image having a color value, each pixel of the real space depth image having a depth value;

obtaining the real space image so as to store the real space image in the memory;

causing a virtual space camera to capture a virtual space image of a virtual space target including a virtual object, the virtual space camera being disposed in a virtual space, the real player performing the instruction input to the virtual object, the virtual space image includes a virtual space color image and a virtual space depth image, each pixel of the virtual space color image having a corresponding color value that is stored in the memory, each pixel of the virtual space depth image has a corresponding depth value that is stored in the memory;

obtaining the virtual space image so as to store the virtual space image in the memory;

converting each of the depth values of a first group of the pixels of the real space depth image to a predetermined depth value, the first group of the pixels being spaced apart from the real space camera by a first distance or more;

creating a player image of the real player from the real space image by excluding the pixels having the predetermined depth values, the player image being stored in the memory;

creating a composite image that is formed by composing part of the virtual space image stored in the memory and the player image; and outputting the composite image to a display so that the display is configured to display the composite image, wherein the processor is configured to synchronize the real space camera with the virtual space camera so that the real space image and the virtual space image are captured at a same time, and the processor is configured to start and end a game application in response to the detection of the instruction input of the real player by the sensor.

15. The method according to claim 14, wherein the real space target further includes a background screen located at a rear side of the real player with respect to the real space camera, the background screen is spaced apart from the real space camera by a second distance that is shorter than the first distance, and wherein the processor is configured to:
  determine a second group of the pixels of the real space color image that has the color value of the background screen; and
  convert each of the depth values of a third group of the pixels of the real space depth image to the predetermined depth value, the second group of the pixels and the third group of the pixels being located at a same coordinate.

* * * * *